United States Patent [19]

Hill et al.

[11] Patent Number: 5,624,490

[45] Date of Patent: Apr. 29, 1997

[54] PROCESS FOR TREATING METAL CHLORIDES

[75] Inventors: Peter Hill, Woodstown, N.J.; Michael T. Hyzny, Burns, Tenn.; John F. Wehner, Wilmington, Del.

[73] Assignee: E. I. Du Pont de Nemours and Company, Wilmington, Del.

[21] Appl. No.: 519,323

[22] Filed: Aug. 25, 1995

Related U.S. Application Data

[63] Continuation-in-part of Ser. No. 242,920, Sep. 16, 1994, abandoned.

[51] Int. Cl.$^6$ .................................................... C08B 7/02
[52] U.S. Cl. ..................... 106/697; 106/705; 106/734; 106/745; 106/792; 106/DIG. 1; 588/256; 588/257; 423/491; 423/492; 210/754
[58] Field of Search .................. 423/491, 492; 106/DIG. 1, 697, 713, 745, 792, 794, 606, 734, 705; 588/252, 256, 257; 405/128, 129; 210/751, 754

[56] References Cited

U.S. PATENT DOCUMENTS

| 4,116,705 | 9/1978 | Chappell | 106/DIG. 1 |
| 4,375,986 | 3/1983 | Pichat | 106/DIG. 1 |
| 5,076,850 | 12/1991 | Eschborn II et al. | 106/606 |

FOREIGN PATENT DOCUMENTS

| 367914-A | 5/1990 | European Pat. Off. . |
| 369946-B1 | 4/1993 | European Pat. Off. . |

*Primary Examiner*—Paul Marcantoni
*Attorney, Agent, or Firm*—D. W. Sullivan

[57] ABSTRACT

A process for preparing high strength, rock-like, water-resistant aggregates by high intensity mixing of acidic metal chlorides and alkaline/cementitious materials in the presence of a low water ratio wherein the metal chlorides are simultaneously neutralized/stabilized and the mixture is solidified.

7 Claims, No Drawings

PROCESS FOR TREATING METAL CHLORIDES

CROSS-REFERENCE TO EARLIER FILED APPLICATION

This application is a continuation-in-part of application Ser. No. 08/242,920, filed May 16, 1994, now abandoned.

BACKGROUND OF THE INVENTION

This invention relates to an improved process for treating metal chlorides and especially such metal chlorides arising as byproducts from the chloride process for making $TiO_2$.

Large amounts of metal chlorides arise as byproducts from various industrial processes. For example, in the chloride process for making $TiO_2$, titanium bearing material or ore is chlorinated to produce $TiCl_4$ and other metal chloride byproducts. Subsequently, the $TiCl_4$ is separated from the byproducts and is oxidized to the desired $TiO_2$. The metal chloride byproducts are highly acidic and often contain iron chlorides as the major ingredient. While some of the byproducts can be used as a flocculant to treat waste water, large amounts must be disposed of by neutralization, land filling, deepwelling, etc.

Many processes have been proposed to neutralize and/or stabilize metal chloride byproducts. Further, highly concentrated acidic metal chloride solutions generally are neutralized, followed by solidification or dewatering. However, such processes appear to be deficient because they are both expensive and produce a product which still must be disposed of by landfill or other means, or produce a product for non-demanding applications.

U.S. Pat. No. 5,076,850 provides a step forward by mixing metal chlorides in aqueous solution with alkaline substance. Therein, it had been found that lower density aggregates, with acceptable properties for road base material, are formed when a minimal amount of energy is used to carry out the mixing. The product produced therein is soil-like and substantially not water resistant.

SUMMARY OF THE INVENTION

In accordance with this invention there is provided:

Process for making high strength, rock-like, water resistant aggregate comprising the steps of:

(a) high intensity mixing acidic metal chlorides with alkaline substance selected from the group consisting essentially of at least one cementitious material and optionally 0.1–50%, based on the total weight of the alkaline substance, of at least one neutralizing agent, said high intensity mixing taking place in the presence of a low water ratio in the amount of less than about 0.7, wherein the acidic metal chlorides are simultaneously neutralized, stabilized and solidification of the mixture is initiated; and (b) curing the product resulting from step (a) until aggregate of desired strength and integrity is formed.

It has been found that the process of this invention simultaneously neutralizes/stabilizes the metal chlorides and solidifies the mixture so that the toxic metals become resistant to leaching by water and are resistant to leaching as determined by current official tests of the U.S. Environmental Protection Agency. Also, the product resulting from the process of this invention is suitable for and can be sold as high quality, water resistant, rock-like aggregate for road building or concrete block manufacture. The product produced from the present invention is particularly suitable for use in wet climate. In contrast, the products from many prior art processes are either only suitable for costly disposal in landfills, useful for non-demanding applications, or are not substantially water resistant and thus fail in wet climate.

DETAILED DESCRIPTION

Step (a):

In this step of the process of this invention, acidic metal chlorides are mixed with high intensity, with an alkaline substance selected from the group consisting essentially of at least one cementitious material and optionally 0.1–50% of at least one neutralizing agent in the presence of a low water ratio. Surprisingly, step (a) simultaneously neutralizes/stabilizes the acidic metal chlorides and initiates solidification of the mixture.

The metal chlorides preferably are in an aqueous solution and/or suspension. Suitable metal chlorides can be obtained as byproducts from various industrial processes. Examples include metal chloride byproducts from the manufacture of titanium dioxide by the chloride process, pickle liquor arising from the cleaning of iron, steel or other metals with hydrochloric acid, and metal chloride byproducts arising from various metal plating processes. This process is especially suitable for treating the acidic metal chloride byproducts arising from the manufacture of titanium dioxide. The acidic metal chlorides are often highly concentrated and contain toxic metal chlorides which pose great difficulty in treating.

Suitable cementitious materials include, but are not limited to, hydraulic cement (including portland cement ASTM types I, IA, IP, IS, II, IIA, III, IIIA, IV and V; aluminous cement), blast furnace slag, lime-containing fly ash and mixtures thereof. Preferred are the foregoing ASTM portland cements, types I, IA, IP, IS, II and IIA. Especially preferred are types I and II portland cements. The amount of cementitious material typically provides a cementitious ratio of about 2 to about 12, preferably from about 6 to about 10, pounds cementitious material per pound of HCl equivalent in the metal chloride mixture. HCl equivalent is defined as total alkali demand expressed as percent HCl, that is, the amount of HCl that is equivalent to the amount of alkali required to raise the pH of the acidic metal chloride to pH 7. For example, it may be determined by titrating a sample of metal chloride to pH 7 with sodium hydroxide.

Suitable neutralizing agents include, but are not limited to, quick lime, residues from making quick lime or acetylene, lime, fly ash, soda ash, CaO, $Ca(OH)_2$, $CaCO_3$, and mixtures thereof. Typically, the neutralizing agent, if used, will be present in an amount of about 0.1–50%, preferably 0.1–25% and most preferably 0.1–10%, based on the total weight of the alkaline substance. The cementitious material may function as the neutralizing agent in the product.

The use of the neutralizing agent is optional. It may be desirable to use some neutralizing agent because it often is less expensive than cementitious material. However, typically, use of the neutralizing agent can degrade the strength of the aggregate formed. Thus, the amount of neutralizing agent should be controlled so that the strength of the aggregate is within the desired range.

The amount of total water present typically provides a water ratio of less than about 0.7, preferably about 0.4 to about 0.65. The water ratio is defined as pounds of total water per pound of alkaline material. Note that the water can be added separately, included with the water contained in the metal chloride or both. Typically, the more water present, the weaker aggregate produced.

The high intensity mixing is defined herein to refer to about 1 to about 50 meter/second and preferably about 8 to about 30 meter/second measured by tip speed. Suitable high intensity mixers include, but are not limited to, Eirich R Series Intensive Mixers (available from Eirich Machines, Inc., N.Y., N.Y.), Scott Turbo Blender (available Scott Equipment Co., New Prague, Minn.), Turbulizer (available from Bepex Corp., Minn., Minn.), Continuous Processor (available from Teledyne Readco, York, Pa.) and the like. The mixing can be batch or continuous with continuous mixing preferred. Residence time is about 1 second to 15 minutes, preferably about 1 second to 5 minutes, and more preferably about 1 second to 2 minutes. It will be appreciated by those skilled in the art that the residence time is dependent on the selection of the high intensity mixer. The mixing should be long enough and/or with high enough energy to completely mix the rapidly reacting materials before the product hardens, fouls the mixer or becomes too dry to form rock-like aggregates. Further, the mixer should be resistant to product build up which would reduce its effectiveness.

As an alternative to characterization by tip speed, high intensity mixing may be described by bulk shear rate in reciprocal seconds, calculated as tip speed divided by mean channel depth. For example, the bulk shear rate in a suitable close clearance kneader or plastics processing machine may be greater than 10 reciprocal seconds.

Typically, at least sufficient alkaline substance should be used to neutralize the metal chlorides and to provide the desired physical strength for the aggregate. For road base material, on a weight basis, this often will require at least about 2 parts alkaline substance per part of acidic metal chloride.

Step (b):

In this step of the process of this invention, the product resulting from step (a) is partially cured and finally cured. By "partially cured" it is meant that such product is allowed to cure for a sufficient time so that it is resistant to slump and flow and does not crumble when disturbed.

Ordinarily, the partial curing will take place in about 4–48 hours and preferably 4–24 hours. It typically is preferable during this step to shape the product resulting from step (a) into a compact mass to minimize evaporation of water. A suitable method for carrying out this step of the process is to deposit the product resulting from step (a) into a concrete holding basin or a vessel. Also, the minimize evaporation of water, the product being processed in this step of the invention can be covered. An alternative method for carrying out this step is to deposit the material onto a concrete pad or other suitable laydown area and optionally covering it with a waterproof membrane (such as a plastic sheet or tarpaulin).

For example, after high intensity mixing, the mixture is discharged into a concrete casting pit, casting trays or the like. The mixture may or may not be subjected to consolidation by vibrators, compactors or the like, and allowed to partially cure for about 24 hours in order to develop strength. If the mixture is subject to consolidation by compactors such as a roller compactor, the mixture should be allowed to slightly harden after discharge and then subjected to the roller compactor. If the mixture is subject to vibrators, it should be done upon discharge. With consolidation, after about 24 hours, the product resembles sheets, slabs or blocks. When broken up, these pieces become angular. The consolidation step is preferred for production of angular aggregate pieces, which results in better interlocking particles in a road base and leads to improved strength. Without consolidation, the product hardens into the shape it developed after discharge, e.g., piles or rows, and is less uniform after 24 hours. After crushing, the unconsolidated product is less angular because it tends to break along the original shape boundaries.

No agitation occurs after this step.

After the aggregates are formed, it ordinarily is desirable to allow final curing to take place so that the aggregate has the desired amount of strength and integrity. This final curing ordinarily will be sufficiently complete within about 1–4 weeks under ambient conditions.

Finishing Operations:

After the final curing, if desired, the aggregate can be subjected to crushing, screening, and moisture adjustment.

The high strength, rock-like, water resistant aggregates made by the process of this invention can be used as base material for road building particularly in wet climate environments, in engineered fills where a quality structural material is desired or for aggregate in concrete block manufacture.

The following Examples are construed as illustrative and not limitative of the remainder of the disclosure in any way whatsoever.

EXAMPLES

The following relates the general procedure for Examples 1–4 described in the Table 1 below. Examples 1–4 were produced in a semiworks scale high intensity mixer Eirich Intensive Mixer Model R08W. The high intensity mixer was started. The solids, portland cement Type I, blast furnace slag, fly ash, and calcium hydroxide were then added and were allowed to mix for approximately 30 seconds. For Examples 1–4, the starting metal chloride slurry was analyzed as follows:

| Bulk density | 1.46 grams/cc |
| Solution density | 1.36 grams/cc |
| HCl equivalent | 17.9% "HCl" |
| Suspended solids | 16.3% |
| pH | 0.0 |

The metal chloride mixture was then added followed by additional water to reach the desired water ratio. The mixture continued to mix at about 3 m/s measured by tip speed of the mixer for approximately 90 seconds, until the product visually looked well mixed.

The product was poured into trays, 2 feet by 3 feet by 8 inches deep and consolidated with a concrete vibrator, and was allowed to harden for 30 days.

Table 1 summarizes Examples 1–4 of the invention.

Example 5 was produced in the continuous Scott Turbo Blender. The portland cement Type I, metal chloride mixture and added water were introduced into the blender. The tip speed was about 26 m/s. The total residence time in the blender under high intensity was from 5–20 seconds. The product was discharged without consolidation, into a concrete casting pit and was allowed to harden for 16 hours. The partially cured product was then moved into a pile for final curing for about 30 days, and then crushed and screened to the desired particle size gradation. For Example 5, the starting metal chloride slurry was analyzed as follows:

| Bulk density g/cc | 1.37 grams/cc |
| Solution density g/cc | 1.26 grams/cc |
| HCl equivalent % | 14.94% "HCl" |
| Suspended solids % | 14.89% |
| pH | 1.3 |

Table 1 summarizes Example 5 of the invention.

For example 5A, the same general procedure was followed as Example 5 except the product upon discharge, slightly hardened and was subjected to consolidation using a roller compactor. The starting metal chloride slurry was analyzed as follows:

| | |
|---|---|
| Bulk density | 1.57 grams/cc |
| Solution density | 1.42 grams/cc |
| HCl equivalent | 16.24% "HCl" |
| Suspended solids | 26.31% |
| pH | 0.0 |

Table 1 summarizes Example 5A of the invention.

TABLE 1

Composition and Properties of Aggregate

| | Example | | | | | | |
|---|---|---|---|---|---|---|---|
| | 1 | 2 | 3 | 4 | 5 | 5A | C6[1] |
| Metal chloride mixture | 40.1 | 36.8 | 33.5 | 39.4 | 44.0 | 37.8 | N/A |
| Water, %[2] | 6.7 | 7.3 | 10.2 | 8.3 | 0.2 | 9.9 | N/A |
| Blast furnace slag, %[3] | 18.7 | 0.0 | 17.0 | 13.7 | 0.0 | 0.0 | N/A |
| Cement, % | 16.4 | 55.9 | 17.0 | 32.0 | 55.8 | 52.2 | N/A |
| Fly ash %[4] | 11.6 | 0.0 | 17.0 | 0.0 | 0.0 | 0.0 | N/A |
| Ca(OH)$_2$ | 6.5 | 0.0 | 5.4 | 6.4 | 0.0 | 0.0 | N/A |
| Water Ratio | 0.53 | 0.48 | 0.50 | 0.56 | 0.50 | 0.50 | N/A |
| Cementitious Ratio | 6.5 | 8.5 | 8.5 | 6.5 | 8.5 | 8.5 | N/A |
| Mixing temp., °C. | 90 | 109 | 86 | 95 | 87 | 87 | N/A |
| R Value | 80 | 80 | 81 | 79 | 79 | 85 | 73 |
| LA Abrasion (500 rev.) | 19.7 | 30.3 | 27.5 | 30.0 | 40 | 40 | 27.5 |
| Fine Durability | 32 | 35 | 32 | 42 | 29 | 27 | N/A[5] |
| Sand Equivalent | 61 | 44 | 47 | 66 | 54 | 64 | 20 |
| | | * | * | * | | | |
| Compressive Strength (psi) | | | | | | | |
| 30 days | 4440 | 5090 | 4500 | 5120 | not tested | | |
| 90 days | 3750 | 5805 | 4580 | 5955 | 1940 | | |
| (average of 2 cylinders) | | | | | | | |

[1]C6 is a Comparative Example of Taiwan Highway Bureau Aggregate Base Class 2 (T.H.B. AB2), which is natural rock. Therefore, the composition of the present invention is not applicable. However, properties of aggregate are provided for comparison.
[2]The % water is the amount of additional H$_2$O (in excess of water-contained in the metal chloride mixture) added to reach the desired water ratio.
[3]Blast furnace slag comprises SiO$_2$ - 34.6%, Al$_2$O$_3$ - 12.1%, Ca) - 39.5%, Fe$_2$O$_3$ - 0.2%, TiO$_2$ - 0.5%, MgO - 8%, SrO - 0.16%, P$_2$O$_5$ - not detected, MnO$_2$ - 0.85%, Cr$_2$O$_3$ - not detected, K$_2$O - 0.07%, ZrO$_2$ - 0.05% and V$_2$O$_5$ - 0.01%. This was determined by X-ray fluorescence.
[4]Fly ash comprises SiO$_2$ - 50.7%, Al$_2$O$_3$ - 25.9%, CaO - 4.2%, Fe$_2$O$_3$ - 5%, TiO$_2$ - 1.4%, MgO - 1%, SrO - 0.3%, P$_2$O$_5$ - 1%, MnO$_2$ - 0.05%, Cr$_2$O$_3$ - 0.02%, K$_2$O - 1.4%, ZrO$_2$ - 0.09% and V$_2$O$_5$ - 0.04%. This was determined by X-ray fluorescence.
[5]Not available, Test was never performed for T.H.B. AB2.

The following Table 2 shows additional properties from Example 5 and for Taiwan Highway Bureau AB2 (T. H.B. AB2)-Comparative Example. AB2 refers to Aggregate Base Class 2.

TABLE 2

Properties of Product

| | Example 5 | Comparative Example T.H.B AB2 |
|---|---|---|
| Resilient Modulus (M psi at 60 psi sum of principal stresses) | | |
| Dry | 30.8 | 20.1 |
| Soaked | 28.4 | 19.4 |
| Cycled | 30.8 | 19.4 |
| Permanent Deformation ($\times 10^{-4}$ in/in after 100,000 cycles) | | |
| Before | 3.8 | 5.7 |
| After | 9.0 | 100 |
| Change | 5.2 | 94.3 |

The following explains the tests performed on the product material. These tests are ASTM tests for aggregates and are used for comparisons with the given specifications for particular applications. ASTM tests are published in "Annual Book of ASTM Standards" Vol 4.01. CAL refers to specifications published by the State of California Dept. of Transportation in "Standard Specifications-January '88".

R Value, CAL 301: A sample is compacted into a cylinder inside of a rubber balloon-like device and measured for its resistance to deformation by a piston squeezing down on it. The resistance (R) value is used to determine the strength of a material and its ability to resist deformation. The test measures the load-carrying capacity or strength of a material and its ability to resist deformation. For California Dept. of Transportation and Taiwan Freeway aggregate AB2, a minimum value of 78 is required.

LA Abrasion, ASTM C131, "Resistance to Degradation of Small-Size Coarse Aggregate by Abrasion and Impact in the Los Angeles Machine": A sample is tumbled in a rotating steel drum with steel balls and the portion broken into fines is measured. The test is a measure of the durability of aggregates. The test is designed to determine the likelihood that a material will break down over time or during the compaction stage to the point that the compacted material would have a different gradation and thus a different R-value (strength value) after compaction or a few years in a flexible pavement system. A large amount of abrasion would alter the friction angles which typically contribute to the strength of material used for road base. For California Dept. of Transportation and Taiwan Highway Bureau aggregate AB2, a maximum value of 50 is allowed.

Fine Durability, CAL 229: A sample is vigorously shaken in water and the amount of fines generated is measured. This test determines the propensity of a material to generate clay fines during the typically saturated stage of compaction or after having been placed and subjected to a wet condition under repeated loading and deflection of traffic. For a material which works due to the interlocking of different sized particles, this test has the most relevance. The fines generated could alter the R-value (typically will lower it) and thus cause the road to prematurely fail. For California Dept. of Transportation aggregate AB2, a minimum value of 35 is required.

Sand Equivalent, CAL-217, also ASTM D2419-91: A measured volume of soil or fine aggregate and a small quantity of flocculating solution are poured into a graduated plastic cylinder and are agitated to loosen the claylike coatings from the sand particles in the test specimen. The specimen is then "irrigated" using additional flocculating solution forcing the claylike material into suspension above the sand. After a prescribed sedimentation period, the height of flocculated clay is read and the height of sand in the cylinder is determined. The sand equivalent is the ratio of the height of sand to the height of clay, times 100. This test to provides a quick indication of R-value in a rapid field-correlation test. Quarries typically submit samples for R-value once per 6 months, but sand equivalents are run routinely. The test indicates under standard conditions, the relative proportions of clay-like or plastic fines and dust in granular soils and fine aggregates that pass the number 4 (4.75 mm) sieve. Sand equivalent expresses the concept that most granular soils and fine aggregates are mixtures of desirable coarse particles, sand and generally undesirable clay or plastic fines and dust. For California Dept. of Transportation aggregate AB2, a minimum value of 35 is required. For Taiwan Freeway aggregate AB2, a minimum value of 30 is required.

Resilient Modulus: The modulus that describes the elastic deflection and rebound under a moving load. This test will simulate the effect of traffic on a pavement section. If the modulus is high, the material is stiffer and less likely to deflect when traffic passes. This means that the pavement is less likely to crack or will take longer to crack than a material that has a lower modulus. The modulus is obtained under different simulated road conditions by varying the deformation pressure (the load applied simulating traffic) and confining pressure (the effect of confining material). The Examples in Table 2 above also included soaking the material and applying dynamic load (100,000 cycles) to the samples to simulate years of traffic before testing.

Permanent Deformation: The distance the material settles as a function of the number of cycles of load. This test basically tells whether or not the pavement will form ruts in the tire tracks and how much traffic will cause that to happen.

Compressive Strength, ASTM C39-86, "Standard Test Method for Compressive Strength of Cylindrical Concrete Specimens": A compressive axial load is applied to molded cylinders or cores at a rate which is within a prescribed range until failure occurs. The compressive strength of the specimen is calculated by dividing the maximum load attained during the test by the cross-sectional area of the specimen. This is a general measure of strength of cast materials. The product resulting from the present invention results in a compressive strength of greater than 1740 psig. As used herein, compressive strength is used interchangeably with crushing strength or compression strength.

Having thus described and exemplified the invention with a certain degree of particularity, it should be appreciated that the following claims are not to be limited but are to be afforded a scope commensurate with the wording of each element of the claims and equivalents thereof.

What is claimed is:

1. A process for preparing high strength, water-resistant aggregate comprising the steps of:
    (a) high intensity mixing metal chlorides with alkaline substance consisting essentially of at least one cementitious material and optionally 0.1–50%, based on the total weight of the alkaline substance, of at least one neutralizing agent selected from the group consisting of lime, fly ash, soda ash, $CaCO_3$ and mixtures thereof, said high intensity mixing taking place in the presence of a low water ratio of less than 0.6 pounds of total water per pound of alkaline substance, at about 1 to about 50 meter/second within about 1 second to about 15 minutes, wherein the metal chlorides are simultaneously neutralized, stabilized and solidification of the mixture is initiated; and
    (b) curing the product resulting from step (a) wherein a compressive strength of greater than 1740 psig is achieved.

2. The process of claim 1 wherein step (b) is preceded by consolidating the product resulting from step (a).

3. The process of claim 2 wherein the high intensity mixing takes place from about 8 to 30 meter/second within 1 second to about 5 minutes.

4. The process of claim 1 wherein the high intensity mixing takes place with a bulk shear rate in excess of 10 $sec^{-1}$.

5. The process of claim 1, claim 2, claim 3 or claim 4 wherein the cementitious material is selected from the group consisting of hydraulic cement, blast furnace slag, lime-containing fly ash and mixtures thereof.

6. The process of claim 5 wherein the hydraulic cement is portland cement.

7. The process of claim 2 wherein the alkaline material is hydraulic cement, the water ratio is about 0.5 and the high intensity mixing is about 26 meter/second measured by tip speed and the residence time of the mixing is about 5 to about 20 seconds.

* * * * *